APPARATUS FOR THE DIGITAL GENERATION OF ACOUSTIC WAVEFORMS
Filed March 4, 1968
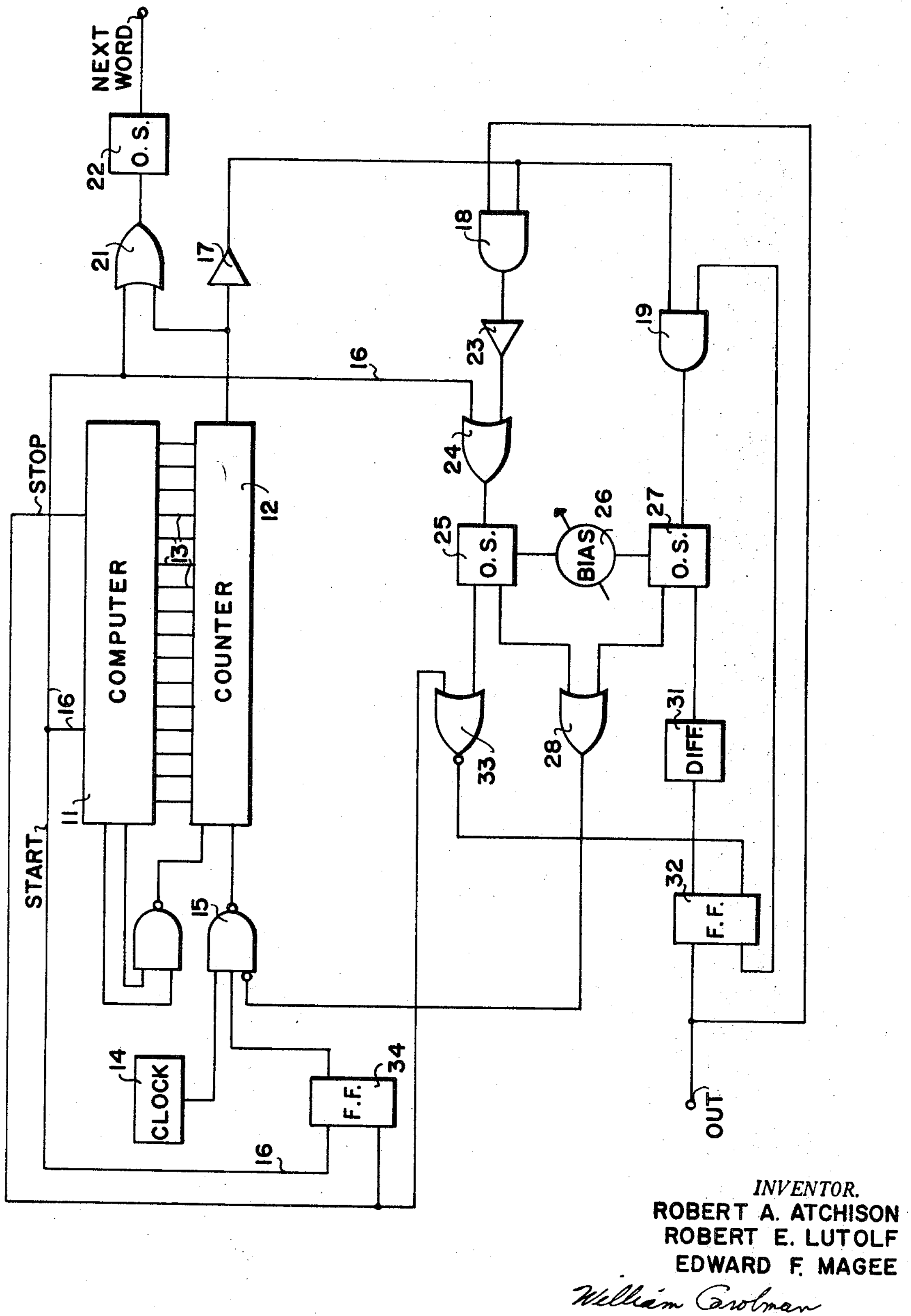
*INVENTOR.*
ROBERT A. ATCHISON
ROBERT E. LUTOLF
EDWARD F. MAGEE
William Grobman

United States Patent Office 3,529,086

Patented Sept. 15, 1970

3,529,086

APPARATUS FOR THE DIGITAL GENERATION OF ACOUSTIC WAVEFORMS

Robert A. Atchison, Rockville, Robert E. Lutolf, College Park, and Edward F. Magee, Crofton, Md., assignors to Singer-General Precision, Inc., Binghamton, N.Y., a corporation of Delaware Filed Mar. 4, 1968, Ser. No. 710,237
Int. Cl. G10l 1/00
U.S. Cl. 179—1 7 Claims

ABSTRACT OF THE DISCLOSURE

The generation of desired sounds and sound waveforms is useful in many fields. For this reason there have been many sound generators devised over the years. The system of this invention utilizes an automatic programming device to control the generation of a large variety of different sounds and sound waveforms. The apparatus comprises a flip-flop or similar device having a plurality of stable conditions. The flip-flop is alternately placed in each of its stable operative states under the control of an automatic programming device. The duration of a complete flip-flop cycle is determinative of the frequency of the generated waveform, and the relative proportioning of the separate portions of the flip-flop cycle determines the amplitude of the generated waveform. One automatic programming device which has been useful in this system is a general purpose digital computer. The system described herein is an improvement over the system described in the copending patent application Ser. No. 707,615, Sound Generator filed in the names of William E. Beavers, Jr. and William H. Sturdevant on Feb. 23, 1968.

This invention relates to apparatus for generating desired sounds automatically and with great versatility and rapidity.

Electrical systems for generating sounds are not new. One of the more popular such systems is the electronic organ. However, in the past some of the problems of the older systems have made those systems inefficient for some uses. In most cases each sound to be generated has its own generator. In addition, the switching from one generator to another when a sequence of sounds is desired is often cumbersome and complex. In a development of more versatile sound systems, the copending application Ser. No. 707,615, Sound Generator filed in the U.S. Patent Office in the names of William E. Beavers, Jr. and William H. Sturdevant on Feb. 23, 1968 discloses a broad sound generation system for generating a large variety of desired sounds.

In that system a flip-flop is placed in each of its stable states by an automatic programming device which determines the length of time that the flip-flop remains in each of its stable states. The duration of each flip-flop cycle determines the frequency of the sound generated at that cycle and the proportion of time that the flip-flop is in each of its two stable states determines the relative amplitude of the sound generated. In one of the embodiments described in the above-mentioned copending application, three counters, together with gating means for entering information into each of the counters, is used in a system which loads two numeric values, one into one counter and the other into another counter. The third counter is a buffer to permit sufficient storage time for the loading of the words to take place. The value of the numeric word loaded into one of the two counters determines the length of time that the flip-flop remains in one of its stable states and the value of the other word determines the time that the flip-flop is in its other state. That system works well, but it has the disadvantage of many systems. That disadvantage is its cost which, although not excessive, desirably can be reduced.

It is an object of this invention to provide a new and improved sound generation system.

It is another object of this invention to provide a new and improved sound waveform generation system which is less complex and less expensive than previous systems.

It is a further object of this invention to provide a new and improved relatively inexpensive sound waveform generation system which is very versatile and rapid in its operation.

Other objects and advantages of this invention will become more apparent as the following description proceeds, which description should be considered together with the single figure of the drawing which is a block diagram of the sound waveform generation system according to this invention.

Referring to the drawing in detail, the reference character 11 designates a block which represents a general purpose digital computer or similar automatic programming device. A counter 12 is shown connected to the computer by a plurality of lines 13. A clock 14, connected through a NAND gate 15 to a count input of the counter 12, supplies pulses thereto. A second input to the gate 15 is supplied from the set output of a flip-flop 34, whose set input 16 is a start pulse from the computer 11. The output of the counter 12 is applied through an inverter 17 to the inputs of gates 18 and 19 and as one input to an OR gate 21, the output of which applies an input signal to a one-shot multivibrator 22. The unstable output of the one-shot 22 is the next word signal which calls for the next word to be transferred from the computer 11 to the counter 12. The start signal 16 is also applied as another input to the OR gate 21 and also as an input to an OR gate 24. In addition, the output of the gate 18 is applied through an inverter 23 as another input to the OR gate 24. The output of the OR gate 24 sets a one-shot mutlivibrator 25 whose unstable output is applied as an input to an OR gate 28 to inhibit the clock gate 15. The stable output of the one-shot 25 is applied as one input to a NOR gate 33. The output of the gate 19 is applied as the set input to a one-shot multivibrator 27 whose stable output is applied through a differentiator 31 to the set input of an OUT flip-flop 32 and whose unstable output is applied to the OR gate 28. The output of the NOR gate 33, whose second input is a stop signal from the computer 11, is applied as the restore input to the flip-flop 32. The restore output from the flip-flop 32 provides the second input to the gate 19, and the set output from the flip-flop is both the other input to gate 18 and the sound waveform generated by this system. A stop signal from the computer 11 is also applied as a restore input to the GO flip-flop 34.

In operation, upon the start of the system, the computer 11 generates a stop signal which is applied to flip-flop 34 and to NOR gate 33 and which restores the flip-flop 34 and the flip-flop 32. The manner in which the computer 11 is started will vary from computer to computer, and the details are not necessary for this discussion. A start signal is then generated by the computer 11 and is applied along line 16 to the set input of the flip-flop 34 to place that flip-flop in its set state, to the OR gate 24 to place the one-shot 25 in its unstable state to inhibit the clock gate 15, and to the OR gate 21 to set the one-shot 22 into its unstable state and call for the transfer of the next word. As a shorthand way of describing the construction and operation of this system, the one-shot multivibrators 22, 25 and 27 are described as having stable and unstable outputs. A one-shot, as all other trigger circuits based on the multivibrator, has two output terminals. When one of these output terminals has a high potential, the other output terminal has a low potential. In this explanation it is assumed that all signals are high. Therefore, that output terminal of the one-shots 22, 25 and 27 which is high when the one-shot is in its unstable condition is referred to as the unstable output. The other output terminal is high when the one-shot is in its stable state, and that terminal is referred to as the stable output. Other conventions can be used, of course, but this one suffices for this explanation. Upon receipt of the next-word signal from the one-shot 22, the computer 11 transfers a word through the parallel lines 13 to the counter 12. Sixteen lines are shown on the drawing representing the output from the computer which has a parallel, 16 bit output, but the number of lines will, of course, vary with the operating characteristics of the computer utilized. The gate 15 is inhibited by the unstable ouput of the one-shot 25 until that one-shot recovers.

When the inhibition is removed from the gate 15, the clock pulses from the clock 14 are applied therethrough and the counter 12 begins counting. If the counter 12 is a normal counter which counts upwardly, then the information inserted into the computer 12 from the computer 11 is the complement of the desired value. If, however, the counter 12 counts downwardly, then the word transferred in represents the true value. In either case, the clock pulses applied through the gate 15 cause the counter to count to zero. Each of the words transferred into the counter 12 represents a numerical quantity, and when a zero count is reached, an output pulse is generated, and this pulse is applied through the OR gate 21 to set the one-shot 22 in its unstable state and call for the next word to be ransferred from the computer 11. In addition, the ouput from the counter 12 is applied through the inverter 17 to the two gates 18 and 19. The flip-flop 32 has been placed in its restored state when the original stop signal was applied to it, and the restored output of the flip-flop 32 is applied to the gate 19 to open that gate when the output pulse from the counter 12 is applied thereto. The output from the gate 19 places the one-shot 27 in its unstable state to transmit a signal through the OR gate 28 and inhibit the clock gate 15. The encounter 12 then stops counting for so long as the one-shot 27 remains in its unstable state. During this time the next word is transferred from the computer 11 into the counter 12. When the one-shot 27 recovers, the inhibition is removed from the clock gate 15 to again allow the clock 14 to supply pulses to the counter 12. Counting again begins. In the meantime, when the one-shot 27 recovered, its stable output pulse was differentiated by the differentiator 31 and was applied to the flip-flop 32 to set that flip-flop. Since the stable output of the one-shot 27 is normally high, the differentiator 31 is used to create a temporary pulse to set flip-flop 32. The set output from the flip-flop 32 is applied to the gate 18 so that the next time the counter 12 generates an output pulse, the gate 18 will pass a signal to set the one-shot 25 and the operation will continue. The variable bias 26 is supplied so that the bias applied to the two one-shots 25 and 27 can be varied to produce variable time durations of their unstable conditions. This will permit utilization of the system shown in the figure with many different computers. The unstable condition of each of the flip-flops 25 and 27 must be sufficiently long to permit the proper transfer, under the worst conditions, of a word from the computer 11 to the counter 12. Since, during the time that the one-shots 25 and 27 are in their unstable states, no clock pulses are transmitted from the clock 14 to the counter 12, this time must be taken into consideration in the preparation of the words placed in the counter 12. In other words, at the rate at which the clock 14 operates each count will occupy a prescribed amount of time. If the total time that the flip-flop 32 is to remain set is equal to, say, a thousand counts, the actual number placed in the counter 12 is 1000 less the number of counts which occupy the amount of time that the gate 15 is inhibited by the one-shots 27 or 25.

In essence, the system shown in the figure provides a means for causing the output flip-flops 32 to change its state under the control of a computer or similar programming device. In the copending application of Beavers and Sturdevant referred to above, the device shown in FIG. 1 required a first counter for determining the frequency of operation, a second counter for determining the amplitude of the signal, and a thid, buffer counter or register. In addition, since the counters were in parallel and the outputs from the computer were in parallel, separate banks of parallel gates were required to direct the output from the computer to one register or another. The system of this invention is greatly simplified since it requires but a single counter, and the actual transfer of information from the computer to that counter can be performed by the equipment in the computer itself. Therefore, this invention saves at least two counters and three banks of gates, in addition to miscellaneous control circuits, over the system shown in the copending application. The system of this invention can also use the filters, integrators, or other devices to achieve the desired harmonic content as shown in the copending Beavers and Sturdevant application.

This specification has disclosed a new and improved system for automatically generating acoustic waveforms. The apparatus shown herein is greatly simplified over previous systems and is versatile to provide waveforms of many different sounds. It is realized, of course, that a review of the above specification may indicate to others who are skilled in the art additional ways in which this invention may be utilized without departing from its principles. It is, therefore, intended that this invention be limited only by the scope of the appended claims.

What is claimed is:

1. A system for generating selected sound-producing waveforms, said system comprising a first trigger device having a plurality of stable operating states, a counter, means for inserting a succession of numerical quantities into said counter, a clock for applying pulses to said counter to cause said counter to count, said counter generating an output signal when a predetermined count is reached, and means for applying successive said output signals from said counter to said trigger device to place said device into its stable states in sequence.

2. The system defined in claim 1 wherein said means for applying successive signals from the counter to said first trigger device comprises a plurality of second trigger devices each having a stable and an unstable operating state, one of said second trigger devices being provided for each stable state of said first trigger device, and means for connecting said first and second trigger devices so that each successive output signal from said counter triggers a successive stable state of said first trigger device.

3. The system defined in claim 2 further including inhibiting gating means interposed between said clock and said counter, and means for connecting said inhibiting gate means to the unstable output of each of said second trigger devices to interrupt the flow of clock pulses to said counter whenever a second trigger device is in its unstable state.

4. The system defined in claim 2 further including a gate interposed between the output of said counter and each of said second trigger devices, said gates having at least two inputs each, one input of all of said gates being connected to the output of said counter and the other input of each of said gates being connected to the previous output of said first trigger device so that the next gate in the sequence is automatically opened to pass the output signal from the counter.

5. The system defined in claim 4 further including output means connected to said first trigger device, said output means providing the desired output from the system.

6. The system defined in claim 2 further including a third trigger device having at least a stable and an unstable state, and means for connecting the output of said counter to the input of said third trigger device so that said third trigger device is placed into its unstable state whenever said counter produces an output signal, the unstable output of said third trigger device providing a signal for the transfer into said counter of the next word.

7. A system for generating selected waveforms of sound signals, said system comprising a counter, means for inserting numerical quantities into said counter, means for applying clock pulses to said counter to cause said counter to count to a predetermined value, said counter generating an output signal when said value is reached, a trigger device having several stable states of operation, and apparatus for applying the output signal from said counter to said trigger device, said appaartus comprising means for applying successive output signals from said counter in sequence to the inputs to said trigger device to sequentially place said trigger device into each of its stable states.

References Cited

UNITED STATES PATENTS 3,201,687 8/1965 Pasquier et al. ------- 328—48

FOREIGN PATENTS 704,816 11/1952 Great Britain.

KATHLEEN H. CLAFFY, Primary Examiner

D. W. OLMS, Assistant Examiner

U.S. Cl. X.R.

328—48